United States Patent
Chen

(10) Patent No.: US 8,332,703 B2
(45) Date of Patent: Dec. 11, 2012

(54) PACKET RETRANSMISSION METHOD AND RELATED ELECTRONIC DEVICE

(75) Inventor: Sheng-Chung Chen, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 984 days.

(21) Appl. No.: 12/345,673

(22) Filed: Dec. 30, 2008

(65) Prior Publication Data

US 2010/0070813 A1     Mar. 18, 2010

(30) Foreign Application Priority Data

Sep. 18, 2008   (TW) .............................. 97135759 A

(51) Int. Cl.
*G08C 25/02*     (2006.01)
(52) U.S. Cl. ...................................................... 714/748
(58) Field of Classification Search .................. None
See application file for complete search history.

(56) References Cited

U.S. PATENT DOCUMENTS

| | | | |
|---|---|---|---|
| 6,694,471 B1 * | 2/2004 | Sharp | 714/749 |
| 2005/0254603 A1 * | 11/2005 | Dominique et al. | 375/340 |
| 2006/0239237 A1 * | 10/2006 | Tong et al. | 370/338 |
| 2008/0098274 A1 * | 4/2008 | Kwon et al. | 714/748 |
| 2008/0209297 A1 * | 8/2008 | Chandra et al. | 714/748 |
| 2008/0244352 A1 * | 10/2008 | Kwon et al. | 714/748 |
| 2009/0259908 A1 * | 10/2009 | Gollapudi | 714/748 |
| 2010/0100787 A1 * | 4/2010 | Zhang et al. | 714/748 |

* cited by examiner

*Primary Examiner* — Gabriel Chu

(74) *Attorney, Agent, or Firm* — Winston Hsu; Scott Margo

(57) ABSTRACT

A packet retransmission method utilized for enhancing data transmission efficiency is disclosed. The packet retransmission method includes steps of retransmitting a first packet which carries a first data at a previous transmission when the first packet is not received successfully, and updating the first data to reform the first packet according to a second data when the retransmission is performed, wherein the second data is a next transmission data of the first data on timing sequence.

12 Claims, 4 Drawing Sheets

PACKET RETRANSMISSION METHOD AND RELATED ELECTRONIC DEVICE

BACKGROUND OF THE INVENTION

1. Field of the Invention

The present invention relates to a packet retransmission method and related electronic device, and more particularly, to a packet retransmission method and related electronic device that updates data carried in a packet for retransmission to enhance data transmission efficiency.

2. Description of the Prior Art

In a packet-switched network, regardless of wired or wireless transmission medium, packet data is liable to be damaged, missed or duplicated due to cable qualities or environmental interferences during transmission. Thus, a variety of error detection and correction technologies has been developed to control packet transmission errors for increasing reliability of packet transmission.

Generally, the error correction technologies can be substantially divided into two types: Retransmission and Forward Error Correction (FEC). The FEC is accomplished by adding redundancy, also known as Error-Correcting Codes (ECC), to transmitted data using a predetermined algorithm. This allows receivers to detect and correct errors (within some bound) of the data being received. Thus, retransmission of the data can often be avoided. However, the drawback of the FEC is that redundant data has to be transmitted.

Compared to the FEC, the retransmission technology is accomplished by resending packets which are either damaged or lost to make sure all transmitted information can be received correctly, in which an Acknowledgment Repeat request (ARQ) mechanism is usually used to repeatedly resend the packets until Acknowledgement (ACK) messages corresponding to each of the packets are received.

However, when packet retransmission is performed, packet overheads, such as packet headers, error checking redundant and synchronization codes, are also retransmitted, so as to cause waste of limited channel resources. Additionally, the packet retransmission also increases data transmission delay, and is unfavorable for use in timing critical applications.

SUMMARY OF THE INVENTION

It is therefore an objective of the present invention to provide a packet retransmission method and related electronic device.

According to the present invention, a packet retransmission method for enhancing data transmission efficiency is disclosed. The packet retransmission method includes steps of retransmitting a first packet when the first packet is not received successfully, the first packet carrying a first data at a previous transmission; and updating the first data to reform the first packet according to a second data before the first packet is retransmitted, the second data being a next transmission data of the first data on timing sequence.

According to the present invention, an electronic device for enhancing data transmission efficiency is disclosed. The electronic device includes a control circuit, a memory and a processor. The control circuit is utilized for realizing a packet transmission function of the electronic device. The memory is installed in the control circuit, and is utilized for storing a program code. The processor is coupled to the memory and installed in the control circuit, and is utilized for executing the program code to operate the control circuit. The program code includes steps of retransmitting a first packet when the first packet is not received successfully, the first packet carrying a first data at a previous transmission; and updating the first data to reform the first packet according to a second data before the first packet is retransmitted, the second data being a next transmission data of the first data on timing sequence.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
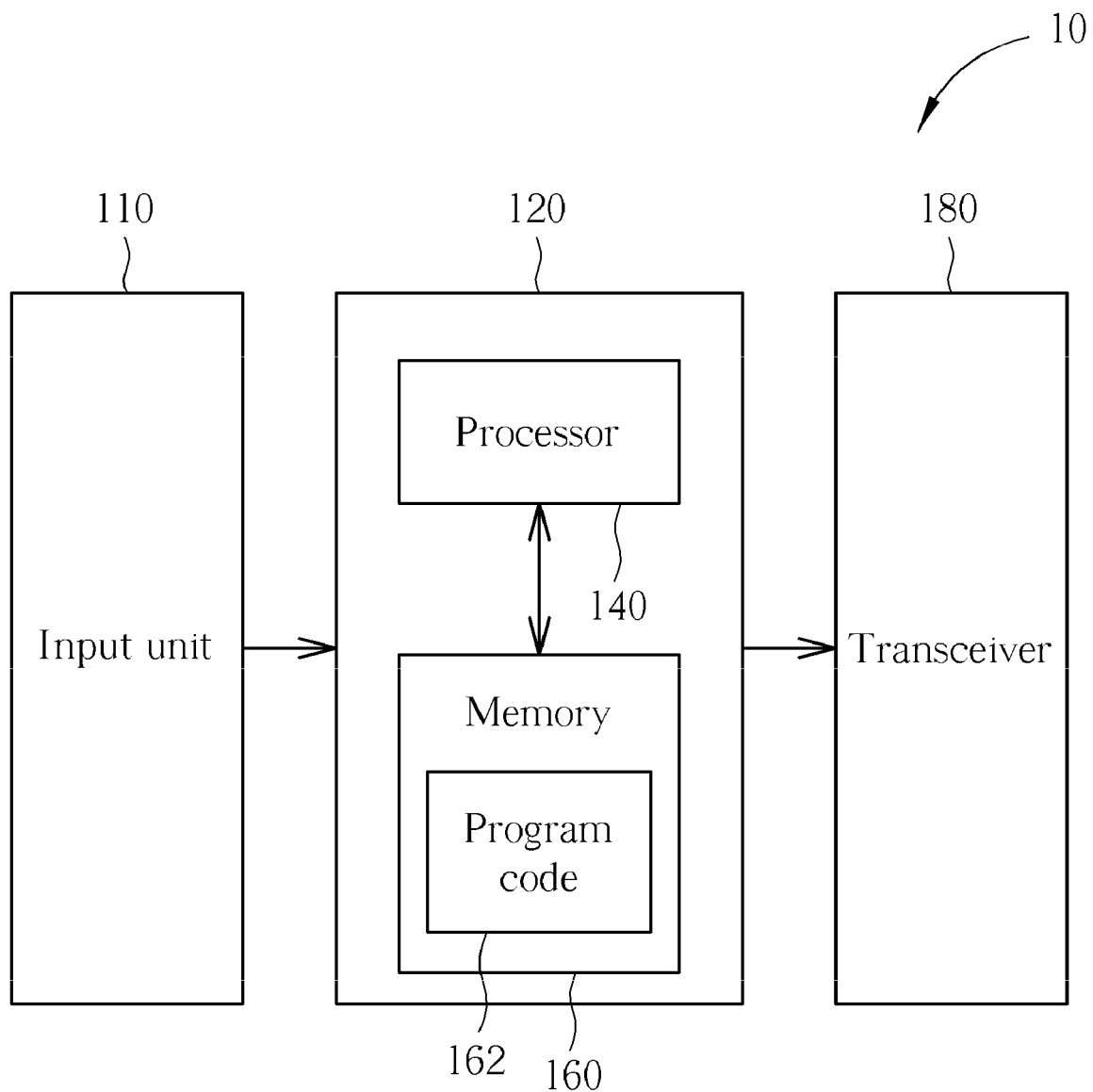
FIG. 1 is a schematic diagram of an electronic device according to an embodiment of the present invention.

Please refer to FIG. 1. FIG. 1 is a schematic diagram of an electronic device 10 according to an embodiment of the present invention. The electronic device 10 can be any electronic device that has a packet transmission function, such as a network appliance, a mobile communications device, an infrared data transmission device or a Bluetooth device, which communicates with other devices by packet transmission. The electronic device 10 mainly includes a control circuit 120, a processor 140 and a memory 160. The control circuit 120 executes a program code 162 stored in the memory 160 via the processor 140 to control packet transmission of the electronic device 10. The electronic device 10 further includes a transceiver 180, utilized for transmitting signals generated by the control circuit 120 by wire or wirelessly, or transferring received signals to the control circuit 120. In addition, the electronic device 10 further utilizes an input device 110 to receive input signals to generate packet data and store the packet data into a buffer (not shown in FIG. 1), which is well-known by those skilled in the art and not narrated herein.

Figure 2:
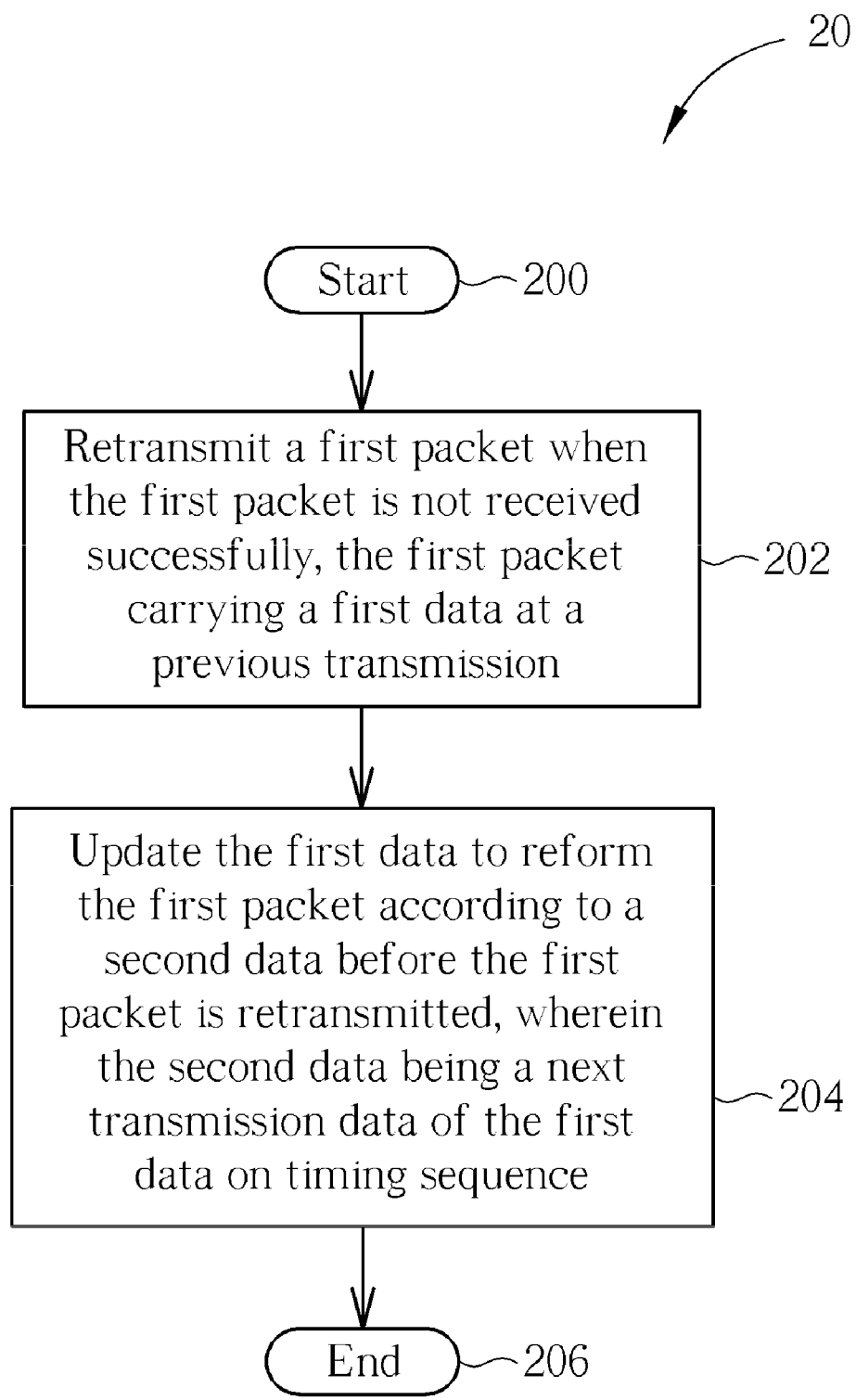
FIG. 2 is a schematic diagram of a packet retransmission process according to an embodiment of the present invention.

Generally, packet data is liable to be damaged, missed or duplicated due to cable qualities or environmental interferences during transmission, so packet retransmission is needed to make sure all transmitted data can be received correctly. In this case, the embodiment of the present invention provides a packet retransmission process for enhancing data transmission efficiency during packet retransmission. Please refer to FIG. 2. FIG. 2 is a schematic diagram of a packet retransmission process 20 according to an embodiment of the present invention. The packet retransmission process 20 can be complied into the program code 162 shown in FIG. 1, and includes the following steps:

Step 200: Start.

Step 202: Retransmit a first packet when the first packet is not received successfully, the first packet carrying a first data at a previous transmission.

Step 204: Update the first data to reform the first packet according to a second data before the first packet is retransmitted, wherein the second data being a next transmission data of the first data on timing sequence.

Step 206: End.

According to the packet retransmission process 20, the first packet is retransmitted when the first packet is not received successfully, such as when a Negative Acknowledgement (NACK) message of the first packet is received or when an Acknowledgement (ACK) message of the first packet is still not received but a timer expires, wherein the first packet carried a first data at a previous transmission. For retransmission, the first data can be updated to reform the first packet according to a second data before the first packet is retransmitted, wherein the second data is a next transmission data of the first data on timing sequence.

In other words, when the packet retransmission is performed, the previous transmission data can be updated to reform the packet for retransmission according to next transmission data in the embodiment of the present invention, to make receivers able to obtain the latest information when successfully receiving the retransmitted packet, so as to enhance data transmission efficiency and reduce occurrences of data transmission delay.

In the embodiment of the present invention, ways to update the previous transmission data to reform the packet for retransmission can be divided into: replacing the previous transmission data by the next transmission data to reform the packet for retransmission; performing logic operation on the previous transmission data to reform the packet for retransmission according to the next transmission data; or concatenating the next transmission data with the previous transmission data to reform packet for retransmission, and are not limited herein.

For example, in some timing critical applications, such as wireless mouse, since previous data is relatively less important, the previous transmission data can be replaced by the next transmission data to reform the packet for retransmission (e.g. replace coordinate data of the previous transmission by later coordinate data), or performing logic operation on the previous transmission data to reform the packet for retransmission according to the next transmission data (e.g. sum up displacement data of the previous transmission with later displacement data) when the packet retransmission is performed, so as to avoid occurrence of data transmission delay.

Preferably, the packet retransmission process 20 further includes steps of determining whether a number of times that the retransmission packet being updated exceeds an upper limit; or determining whether a total data length of the data carried in the retransmission packet exceeds a length limit. In such a situation, a same packet as the previous transmission is retransmitted in the embodiment of the present invention, so as to avoid data discontinuity resulted from the data being updated too much.

Figure 3:
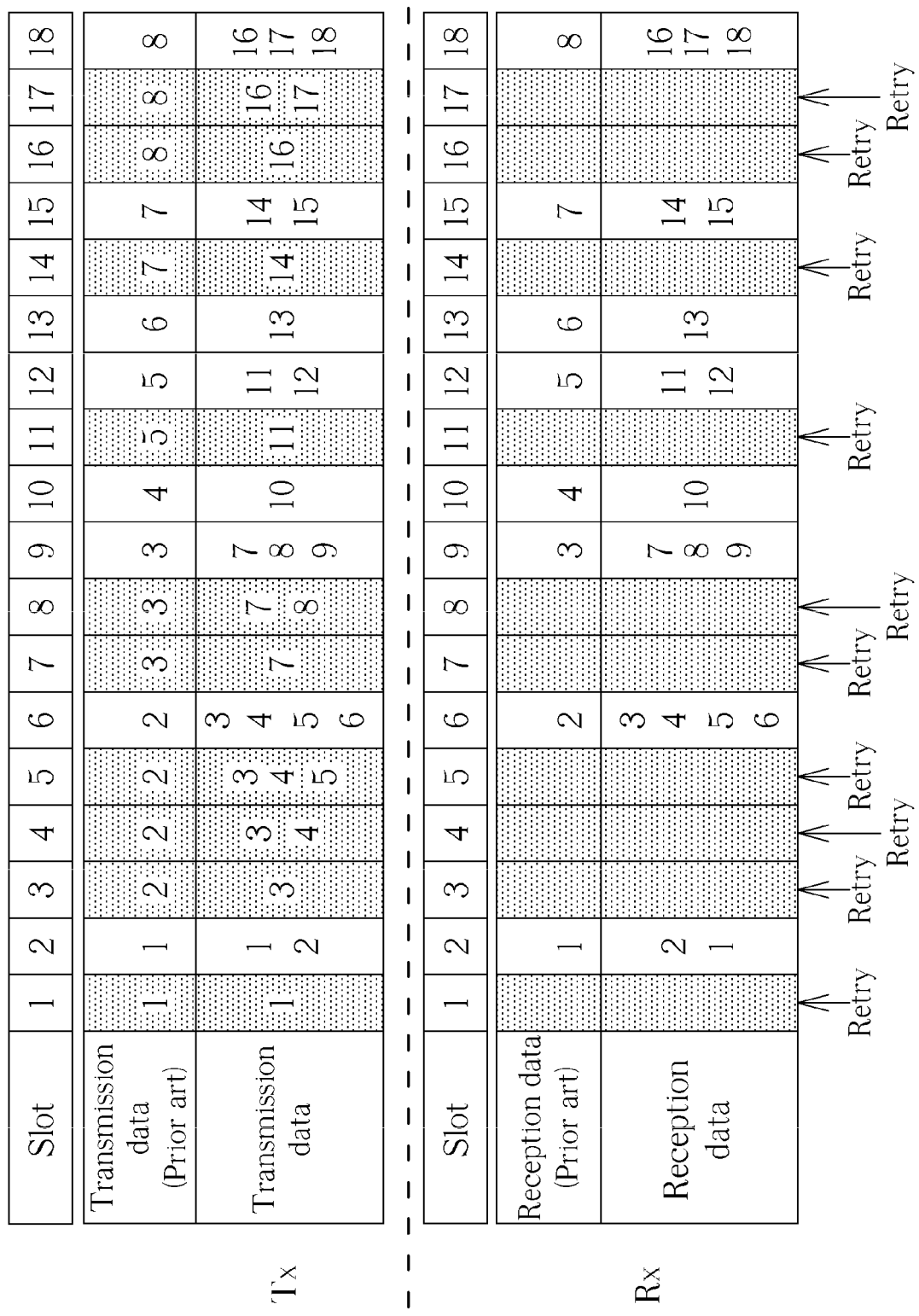
FIG. 3 illustrates an embodiment of the packet retransmission process of the present invention.

Please refer to FIG. 3. FIG. 3 illustrates an embodiment of the packet retransmission process 20 according to the present invention, in which shaded slots indicate where a transmitted packet cannot be successfully received by a receiver RX and needs to be retransmitted, and un-shaded slots indicate where a transmitted packet is successfully received without the need for retransmission. As shown in FIG. 3, since a transmitted packet of the $1^{st}$ slot cannot be successfully received by a receiver RX, a transmitter TX has to update the data carried in the packet according to next transmission data in order for retransmission at the $2^{nd}$ slot. Similarly, since transmitted packets of the $3^{rd}$, $4^{th}$ and $5^{th}$ slots also fail to be received by the receiver RX, a transmitted packet of the $6^{th}$ slot may include update results of the $3^{rd}$ to $6^{th}$ transmission data. Other slots are also operated in like manners. Therefore, compared with the prior art that merely completes eight data transmission during the $0^{th}$ to $18^{th}$ slots, the embodiment of the present invention can significantly enhance the data transmission efficiency and also reduce the occurrence of data transmission delay.

Figure 4:
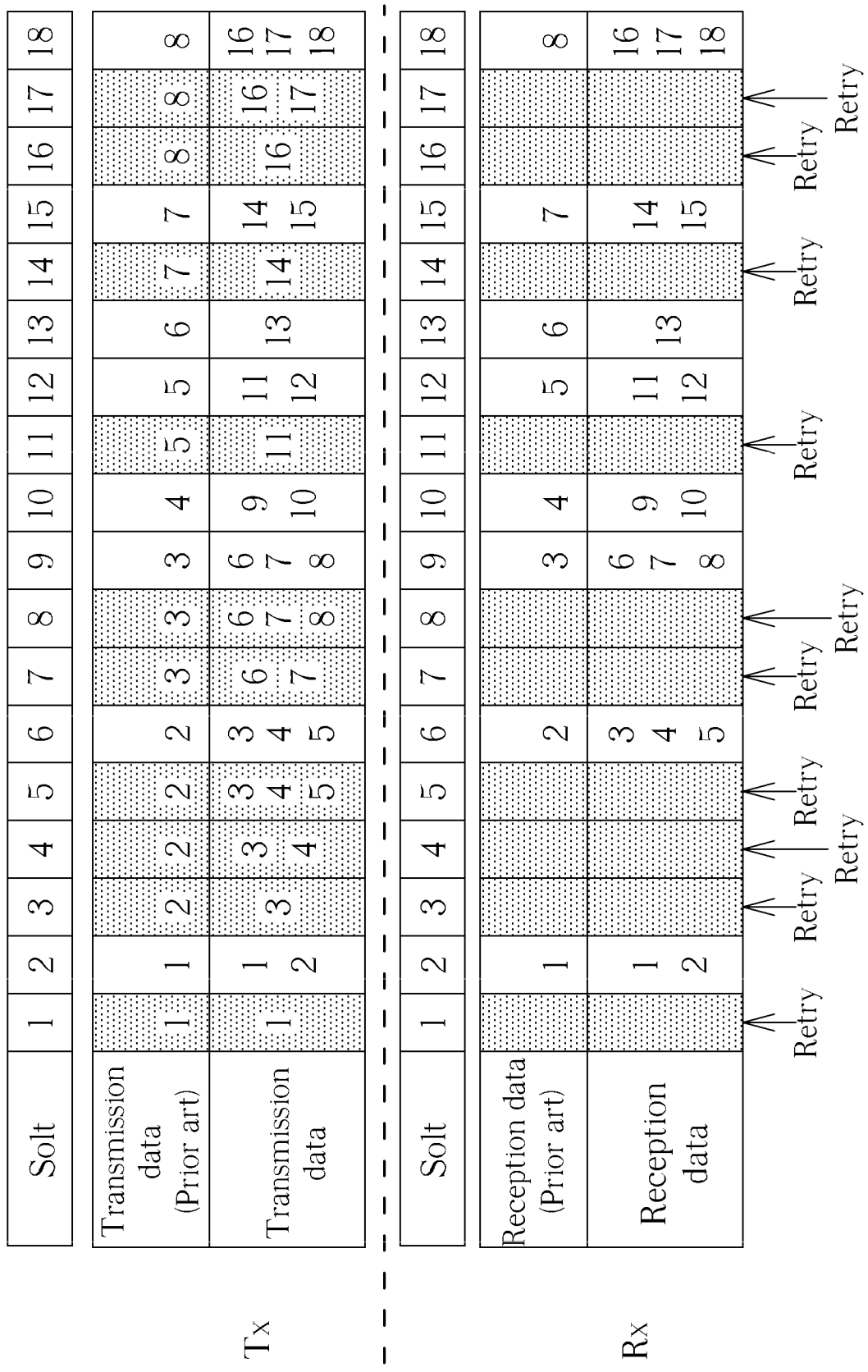
FIG. 4 illustrates another embodiment of the packet retransmission process of the present invention.

On the other hand, please refer to FIG. 4. FIG. 4 illustrates another embodiment of the packet retransmission process 20 according to the present invention. In this case, the number of times the retransmission packet being updated is further limited, so as to avoid too much discontinuity on transmitted data. Thus, compared with FIG. 3, since the update times of the retransmission packet reaches an upper limit at the $6^{th}$ slot (three times as an example), the transmitter TX would retransmit a packet same as the previous transmission at the following slots until the packet is successfully received. Related operation is similar to FIG. 3, and is not narrated herein again.

Please note that the above-mentioned electronic device 10 is merely an exemplary illustration of the present invention, and that those skilled in the art can certainly make appropriate modifications to realize the packet retransmission process of the present invention, but not restricted in firmware or software manners.

As mentioned above, when the packet retransmission is performed, the data carried in the packet for retransmission can be updated with next transmission data in the embodiment of the present invention, so as to enhance data transmission efficiency and reduce occurrences of data transmission delay.

Those skilled in the art will readily observe that numerous modifications and alterations of the device and method may be made while retaining the teachings of the invention.

What is claimed is:

1. A packet retransmission method for enhancing data transmission efficiency comprising:
    retransmitting a first packet when the first packet is not received successfully, the first packet carrying a first data at a previous transmission;
    updating the first data to reform the first packet according to a second data before the first packet is retransmitted, the second data being a next transmission data of the first data on timing sequence, wherein updating the first data to reform the first packet according to the second data comprises concatenating the second data with the first data to reform the first packet;
    determining whether a total data length of the first data and the second data exceeds an upper limit; and
    retransmitting the first packet same as the previous transmission when the total data length exceeds the upper limit.

2. The packet retransmission method of claim 1, wherein updating the first data to reform the first packet according to the second data comprises replacing the first data by the second data to reform the first packet.

3. The packet retransmission method of claim 1, wherein updating the first data to reform the first packet according to the second data comprises performing logic operation on the first data to reform the first packet according to the second data.

4. An electronic device for enhancing data transmission efficiency, the electronic device comprising:
    a control circuit for realizing a packet transmission function of the electronic device;
    a memory, installed in the control circuit, for storing a program code; and
    a processor, coupled to the memory and installed in the control circuit, for executing the program code to operate the control circuit;
    wherein the program code comprises:
        retransmitting a first packet when the first packet is not received successfully, the first packet carrying a first data at a previous transmission;

updating the first data to reform the first packet according to a second data before the first packet is retransmitted, wherein the second data is a next transmission data of the first data on timing sequence, wherein updating the first data to reform the first packet according to the second data comprises concatenating the second data with the first data to reform the first packet;

determining whether a total data length of the first data and the second data exceeds an upper limit; and retransmitting the first packet same as the previous transmission when the total data length exceeds the upper limit.

5. The electronic device of claim 4, wherein updating the first data to reform the first packet according to the second data comprises replacing the first data by the second data to reform the first packet.

6. The electronic device of claim 4, wherein updating the first data to reform the first packet according to the second data comprises performing logic operation on the first data to reform the first packet according to the second data.

7. A packet retransmission method for enhancing data transmission efficiency comprising:

retransmitting a first packet when the first packet is not received successfully, the first packet carrying a first data at a previous transmission;

updating the first data to reform the first packet according to a second data before the first packet is retransmitted, the second data being a next transmission data of the first data on timing sequence;

determining whether a number of times the first packet being updated exceeds an upper limit; and retransmitting the first packet same as the previous transmission when the number of times the first packet being updated exceeds the upper limit.

8. The packet retransmission method of claim 7, wherein updating the first data to reform the first packet according to the second data comprises replacing the first data by the second data to reform the first packet.

9. The packet retransmission method of claim 7, wherein updating the first data to reform the first packet according to the second data comprises performing logic operation on the first data to reform the first packet according to the second data.

10. An electronic device for enhancing data transmission efficiency, the electronic device comprising:

a control circuit for realizing a packet transmission function of the electronic device;

a memory, installed in the control circuit, for storing a program code; and a processor, coupled to the memory and installed in the control circuit, for executing the program code to operate the control circuit;

wherein the program code comprises:

retransmitting a first packet when the first packet is not received successfully, the first packet carrying a first data at a previous transmission;

updating the first data to reform the first packet according to a second data before the first packet is retransmitted, wherein the second data is a next transmission data of the first data on timing sequence;

determining whether a number of times the first packet being updated exceeds an upper limit; and retransmitting the first packet same as the previous transmission when the number of times the first packet being updated exceeds the upper limit.

11. The electronic device of claim 10, wherein updating the first data to reform the first packet according to the second data comprises replacing the first data by the second data to reform the first packet.

12. The electronic device of claim 10, wherein updating the first data to reform the first packet according to the second data comprises performing logic operation on the first data to reform the first packet according to the second data.

* * * * *